(12) United States Patent
Malhotra et al.

(10) Patent No.: US 9,870,287 B1
(45) Date of Patent: Jan. 16, 2018

(54) VOLUME DUPLICATION

(71) Applicant: EMC Corporation, Hopkinton, MA (US)

(72) Inventors: Sumeet K. Malhotra, Bangalore (IN); Colin D. Durocher, Montreal (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 609 days.

(21) Appl. No.: 14/145,245

(22) Filed: Dec. 31, 2013

(51) Int. Cl.
*G06F 17/30* (2006.01)
*G06F 11/14* (2006.01)

(52) U.S. Cl.
CPC .... *G06F 11/1446* (2013.01); *G06F 17/30067* (2013.01); *G06F 17/30864* (2013.01)

(58) Field of Classification Search
CPC ................................................. G06F 17/30067
USPC ......................................................... 707/649
See application file for complete search history.

(56) References Cited

U.S. PATENT DOCUMENTS

| | | | | |
|---|---|---|---|---|
| 8,554,954 B1* | 10/2013 | Derbeko | ............. | G06F 11/1441 710/5 |
| 2005/0071588 A1* | 3/2005 | Spear | .................. | G06F 11/2064 711/162 |
| 2006/0106747 A1* | 5/2006 | Bartfai | ................ | G06F 11/2064 707/704 |
| 2007/0130213 A1* | 6/2007 | Jean-Denis | ......... | G06F 11/2064 707/202 |

OTHER PUBLICATIONS

Zhou, Ke et al., "Pipelining Scheduling and Hierarchical-Volume Management in a Storage Area Network", Proceedings of the 2006 IEEE/SMC International Conference on System of Systems Engineering, Los Angeles, CA, USA, Apr. 2006, pp. 265-270.*

* cited by examiner

*Primary Examiner* — Shahid Alam
(74) *Attorney, Agent, or Firm* — Brian J. Colandreo; Mark H. Whittenberger; Holland & Knight LLP

(57) ABSTRACT

A method, computer program product, and computing system for receiving a point-in-time copy command for a virtual volume exposed within a storage virtualization layer of a storage system. The point-in-time copy command is provided to one or more data arrays underlying the storage virtualization layer. The virtual volume is associated with physical storage within the one or more data arrays, thus defining associated physical storage. A level of high-availability is identified for the associated physical storage. A copy of the associated physical storage is generated that has the same level of high-availability, thus defining a high-availability copy.

20 Claims, 4 Drawing Sheets

VOLUME DUPLICATION

TECHNICAL FIELD

This disclosure relates to storage systems and, more particularly, to the systems and methods for copying virtual volumes.

BACKGROUND

Storing and safeguarding electronic content is of paramount importance in modern business. Accordingly, large storage systems may be utilized to protect such electronic content. Unfortunately, when making point-in-time copies of virtual storage volumes, the methodologies that ensure the high-availability of these virtual storage volumes are often not duplicated within the copy.

SUMMARY OF DISCLOSURE

In one implementation, a computer-implemented method includes receiving a point-in-time copy command for a virtual volume exposed within a storage virtualization layer of a storage system. The point-in-time copy command is provided to one or more data arrays underlying the storage virtualization layer. The virtual volume is associated with physical storage within the one or more data arrays, thus defining associated physical storage. A level of high-availability is identified for the associated physical storage. A copy of the associated physical storage is generated that has the same level of high-availability, thus defining a high-availability copy.

One or more of the following features may be included. The high-availability copy may be exposed within the storage virtualization layer. Identifying a level of high-availability for the associated physical storage may include identifying a quantity of legs for the associated physical storage. The virtual volume may be an encapsulated virtual volume. The point-in-time copy command may be one of: a differential point-in-time copy command; and a full point-in-time copy command. The associated physical storage may include mirrored physical storage. The associated physical storage may include stripped physical storage.

In another implementation, a computer program product resides on a computer readable medium and has a plurality of instructions stored on it. When executed by a processor, the instructions cause the processor to perform operations including receiving a point-in-time copy command for a virtual volume exposed within a storage virtualization layer of a storage system. The point-in-time copy command is provided to one or more data arrays underlying the storage virtualization layer. The virtual volume is associated with physical storage within the one or more data arrays, thus defining associated physical storage. A level of high-availability is identified for the associated physical storage. A copy of the associated physical storage is generated that has the same level of high-availability, thus defining a high-availability copy.

One or more of the following features may be included. The high-availability copy may be exposed within the storage virtualization layer. Identifying a level of high-availability for the associated physical storage may include identifying a quantity of legs for the associated physical storage. The virtual volume may be an encapsulated virtual volume. The point-in-time copy command may be one of: a differential point-in-time copy command; and a full point-in-time copy command. The associated physical storage may include mirrored physical storage. The associated physical storage may include stripped physical storage.

In another implementation, a computing system including a processor and memory is configured to perform operations including receiving a point-in-time copy command for a virtual volume exposed within a storage virtualization layer of a storage system. The point-in-time copy command is provided to one or more data arrays underlying the storage virtualization layer. The virtual volume is associated with physical storage within the one or more data arrays, thus defining associated physical storage. A level of high-availability is identified for the associated physical storage. A copy of the associated physical storage is generated that has the same level of high-availability, thus defining a high-availability copy.

One or more of the following features may be included. The high-availability copy may be exposed within the storage virtualization layer. Identifying a level of high-availability for the associated physical storage may include identifying a quantity of legs for the associated physical storage. The virtual volume may be an encapsulated virtual volume. The point-in-time copy command may be one of: a differential point-in-time copy command; and a full point-in-time copy command. The associated physical storage may include mirrored physical storage. The associated physical storage may include stripped physical storage.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
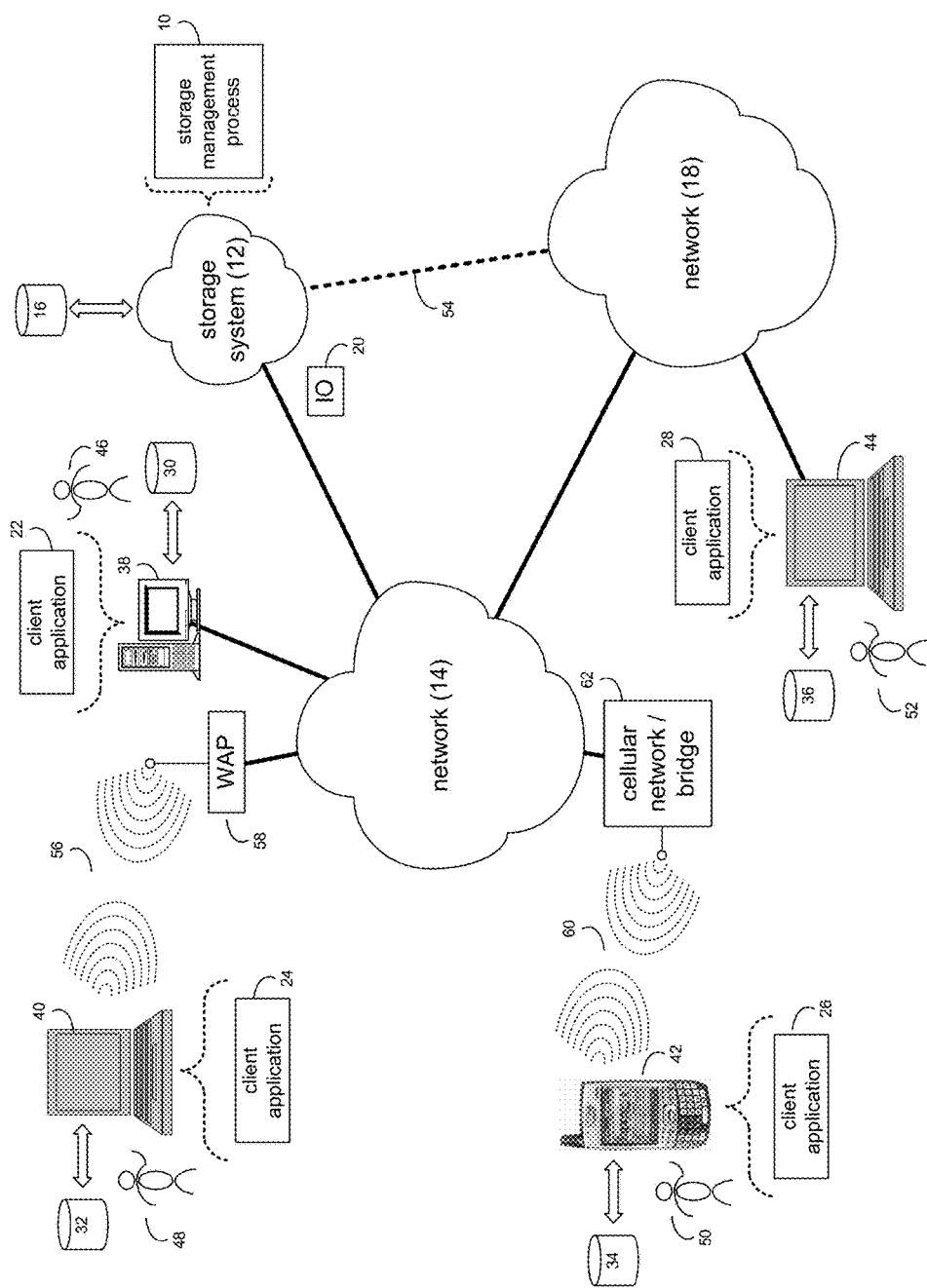
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
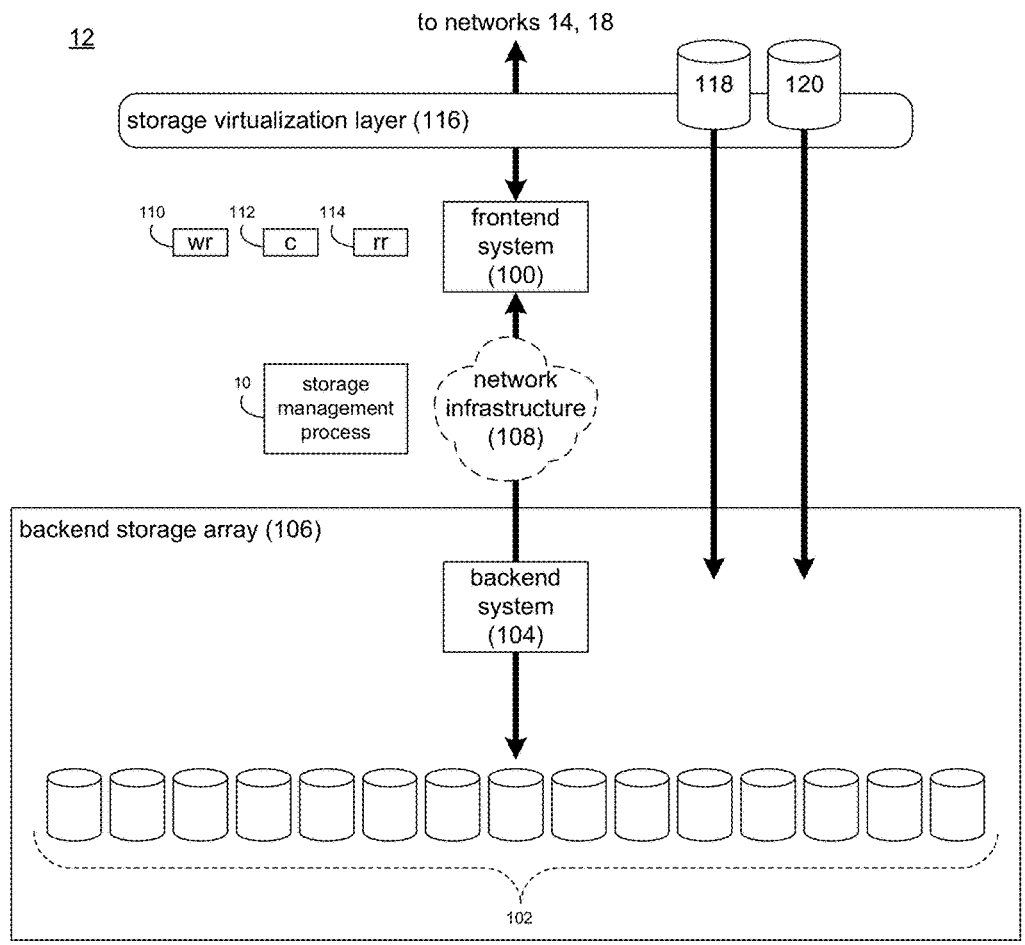
FIG. 2 is a diagrammatic view of the storage system of FIG. 1.

Referring also to FIG. 2, storage system 12 may include frontend system 100 and plurality of storage targets 102. The quantity of storage targets included within plurality of storage targets 102 may be increased or decreased depending upon e.g. the level of redundancy/performance/capacity required.

Plurality of storage targets 102 may be configured to provide various levels of performance and/or high availability. For example, a portion of plurality of storage targets 102 may be configured as a RAID 0 array, in which data is stripped across storage targets. By striping data across a plurality of storage targets, improved performance may be realized. However, RAID 0 arrays do not provide a level of high availability. Accordingly, a portion of plurality of storage targets 102 may be configured as a RAID 1 array, in which data is mirrored between storage targets. By mirroring data between storage targets, a level of high availability is achieved as multiple copies of the data are stored within storage system 12.

While plurality of storage targets 102 is discussed above as being configured in a RAID 0 or RAID 1 array, this is for illustrative purposes only and is not intended to be a limitation of this disclosure, as other configurations are possible. For example, plurality of storage targets 102 may be configured as a RAID 3, RAID 4, RAID 5 or RAID 6 array.

Plurality of storage targets 102 may include one or more coded targets. As is known in the art, a coded target may be used to store coded data that may allow for the regeneration of data lost/corrupted on one or more of plurality of storage targets 102. An example of such a coded target may include but is not limited to a hard disk drive that is used to store parity data within a RAID array. The quantity of coded targets included within plurality of storage targets 102 may be increased or decreased depending upon e.g. the level of redundancy/performance/capacity required.

Examples of plurality of storage targets 102 may include one or more electro-mechanical hard disk drives and/or solid-state/Flash devices, wherein the combination of plurality of storage targets 102 and processing/control systems (e.g., backend system 104) may form backend storage array 106.

The manner in which storage system 12 is implemented may vary depending upon e.g. the level of redundancy/performance/capacity required. For example, storage system 12 may be a RAID device in which first frontend system 100 is a RAID controller card and plurality of storage targets 102 are individual "hot-swappable" hard disk drives. An example of such a RAID device may include but is not limited to an NAS device. Alternatively, storage system 12 may be configured as a SAN, in which first frontend system 100 may be e.g., a server computer and each of plurality of storage targets 102 may be a RAID device and/or computer-based hard disk drive. Further still, one or more of plurality of storage targets 102 may be a SAN.

In the event that storage system 12 is configured as a SAN, the various components of storage system 12 (e.g. first frontend system 100, plurality of storage targets 102, and backend system 104) may be coupled using network infrastructure 108, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to first frontend system 100, may be executed by one or more processors (not shown) and one or more memory architectures (not shown) included within first frontend system 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when first frontend system 100 is configured as an application server, these IO requests may be internally generated within first frontend system 100. Examples of IO request 20 may include but are not limited to data write request 110 (i.e. a request that content 112 be written to storage system 12) and data read request 114 (i.e. a request that content 112 be read from storage system 12).

During operation of first frontend system 100, content 112 to be written to storage system 12 may be processed by first frontend system 100. Additionally/alternatively and when first frontend system 100 is configured as an application server, content 112 to be written to storage system 12 may be internally generated by first frontend system 100.

A storage virtualization layer (e.g., storage virtualization layer 116) may be utilized with respect to storage system 12 to allow for the creation of virtual volumes. An example of such a storage virtualization layer may be created using storage virtualization products such as the EMC VPLEX product line. Accordingly, storage virtualization layer 116 may be used to create virtual volumes 118, 120, wherein these virtual volumes may be accessible and useable by e.g., user 46, 48, 50, 52 for storing data. Virtual volumes 118, 120 may be formed by mapping physical storage included within backend storage array 106. As discussed above, backend storage array 106 may include plurality of storage targets 102 that are physical storage devices. Accordingly, each of virtual volumes 118, 120 (that are usable by users 46, 48, 50, 52) may be constructed e.g., from a single storage target included within plurality of storage targets 102 or from multiple storage targets included within plurality of storage targets 102.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on first frontend system 100, some or all of the instruction sets and subroutines of storage management process 10 may be executed by one or more processors (not shown) and one or more memory architectures (not shown) included within backend system 104 of backend storage array 106.

Figure 3:
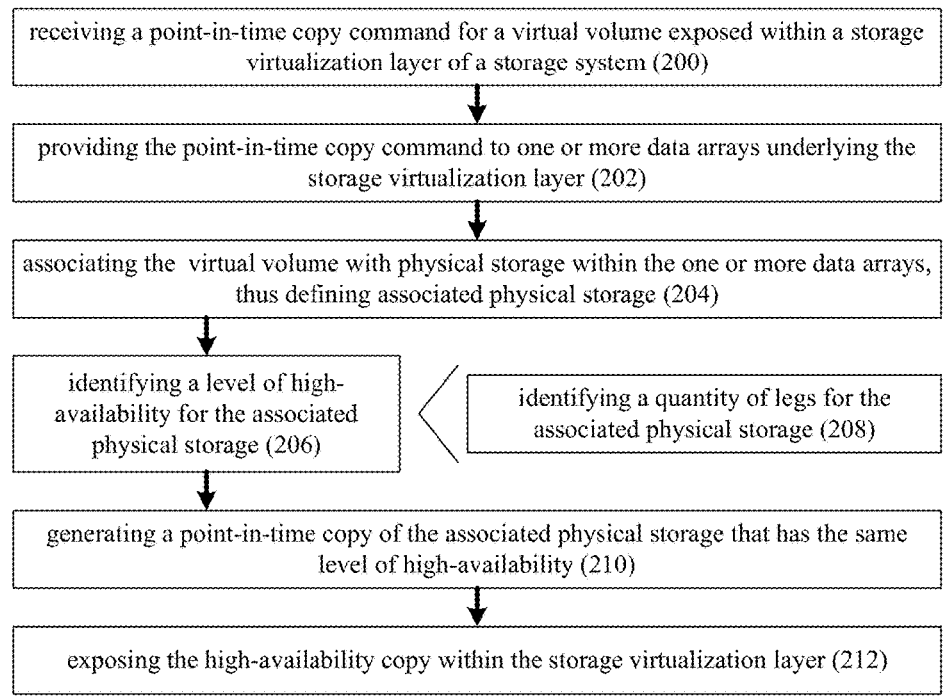
FIG. 3 is a flow chart of one implementation of the storage management process of FIG. 1.
Figure 4:
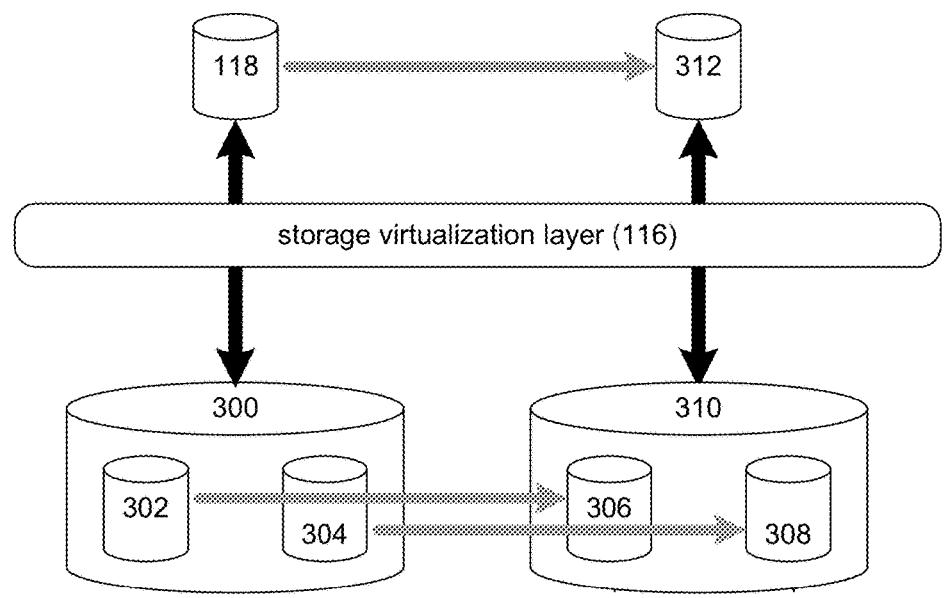
FIG. 4 is a diagrammatic view of the mapping of a virtual volume within the storage system of FIG. 1.

The Storage Management Process:

Referring also to FIGS. 3-4, storage management process 10 may receive 200 a point-in-time copy command for a virtual volume (e.g., virtual volume 118) exposed within storage virtualization layer 116 of storage system 12. Assume for this example that virtual volume 118 is configured to have a high level of availability and is a mirrored volume (e.g., mirrored volume 300). Further assume for this example that virtual volume 118 is an "encapsulated" virtual volume, wherein the entirety of virtual volume 118 is mapped onto a single storage target (e.g., storage target 302) included within plurality of storage targets 102, wherein this single storage target is mirrored (as discussed above) to a second storage target (e.g., storage target 304) included within plurality of storage targets 102.

While in this particular example, virtual volume 118 is described as being an "encapsulated" virtual volume, this is for illustrative purposes only and is not intended to be a limitation of this disclosure, as other configurations are possible and are considered to be within the scope of this disclosure. For example, virtual volume 118 may be mapped onto a plurality of storage targets included within plurality of storage targets 102 (as opposed to single storage target 302 included within plurality of storage targets 102).

Concerning the above-described point-in-time copy command, this point-in-time copy command may be a differential point-in-time copy command or a full point-in-time copy command. As is known in the art, a differential point-in-time copy command is a copy command that copies only those files that have changed since the previous copy command was executed; wherein a full point-in-time copy command is a copy command that copies all files, regardless of whether or not they have changed since the previous copy command was executed.

Upon receiving the above-described point-in-time copy command, storage management process 10 may provide 202 this point-in-time copy command to one or more data arrays (e.g., backend storage array 106) underlying storage virtualization layer 116. Accordingly, storage management process 10 may pass the above-described point-in-time copy command to backend storage array 106 for processing.

Storage management process 10 may associate 204 the virtual volume (e.g., virtual volume 118 identified within the above-described point-in-time copy command) with physical storage included within the one or more data arrays (e.g., backend storage array 106), thus defining associated physical storage. As discussed above and in this example, virtual volume 118 is an "encapsulated" virtual volume, wherein the entirety of virtual volume 118 is mapped onto a single storage target (e.g., storage target 302) included within plurality of storage targets 102. Accordingly, the associated physical storage in this example is storage target 302 (i.e., the physical storage within backend storage array 106).

Further, storage management process 10 may identify 206 a level of high-availability for the associated physical storage. As discussed above and for this example, virtual volume 118 is a highly-available virtual volume, in that it is a mirrored virtual volume. Accordingly, the level of high-availability identified for the associated physical storage is mirroring. When identifying 206 a level of high-availability for the associated physical storage, storage management process 10 may identify 208 a quantity of legs for the associated physical storage. Since (in this example) storage target 302 is mirrored onto storage target 304, the associated physical storage is a two leg system.

While in this particular example, virtual volume 118 is described above as being a mirrored virtual volume, wherein the content stored within virtual volume 118 is mirrored between multiple storage targets (e.g., storage targets 302, 304), this is for illustrative purposes only and is not intended to be a limitation of this disclosure, as other configurations are possible and are considered to be within the scope of this disclosure. For example, virtual volume 118 may be a stripped virtual volume, wherein the content stored within virtual volume 118 is stripped across multiple storage targets.

Once storage management process 10 associates 204 virtual volume 118 with physical storage included within backend storage array 106 and identifies 206 a level of high-availability for the associated physical storage, storage management process 10 may generate 210 a copy of the associated physical storage that has the same level of high-availability (thus defining a high-availability copy).

For example, storage management process 10 may generate 210 a copy of storage target 302, which is illustrated in FIG. 4 as storage target 306. Additionally, storage management process 10 may generate 210 a copy of storage target 304, which is illustrated in FIG. 4 as storage target 308). Storage target 306 and storage target 308 may then be combined to form mirrored volume 310 (i.e., the high-availability copy of mirrored volume 300).

Once the high-availability copy of mirrored volume 300 (namely mirrored volume 310) is generated 210, storage management process 10 may expose 212 mirrored volume 310 within storage virtualization layer 116, thus satisfying the above-described point-in-time copy command.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
    receiving a point-in-time copy command for a virtual volume exposed within a storage virtualization layer of a storage system;
    providing the point-in-time copy command to one or more data arrays underlying the storage virtualization layer;
    associating the virtual volume with physical storage within the one or more data arrays, thus defining associated physical storage;
    identifying a level of high-availability for the associated physical storage, wherein the level of high-availability is indicative of a redundancy technique used for the associated physical storage; and
    defining a high-availability copy by generating a copy of the associated physical storage that has the same level of high-availability, wherein the high-availability copy includes a differential point in time copy of the virtual volume including data that has changed since a previous copy command.

2. The computer-implemented method of claim 1 further comprising:
    exposing the high-availability copy within the storage virtualization layer.

3. The computer-implemented method of claim 1 wherein identifying a level of high-availability for the associated physical storage includes:
    identifying a quantity of legs for the associated physical storage.

4. The computer-implemented method of claim 1 wherein the virtual volume is an encapsulated virtual volume.

5. The computer-implemented method of claim 1 wherein the point-in-time copy command is:
    a full point-in-time copy command.

6. The computer-implemented method of claim 1 wherein the associated physical storage includes mirrored physical storage.

7. The computer-implemented method of claim 1 wherein the associated physical storage includes stripped physical storage.

8. A computer program product residing on a non-transitory computer readable medium having a plurality of instructions stored thereon which, when executed by a processor, cause the processor to perform operations comprising:
    receiving a point-in-time copy command for a virtual volume exposed within a storage virtualization layer of a storage system;
    providing the point-in-time copy command to one or more data arrays underlying the storage virtualization layer;
    associating the virtual volume with physical storage within the one or more data arrays, thus defining associated physical storage;
    identifying a level of high-availability for the associated physical storage, wherein the level of high-availability is indicative of a redundancy technique used for the associated physical storage; and
    defining a high-availability copy by generating a copy of the associated physical storage that has the same level of high-availability, wherein the high-availability copy includes a differential point in time copy of the virtual volume including data that has changed since a previous copy command.

9. The computer program product of claim 8 further comprising instructions for performing operations including:
    exposing the high-availability copy within the storage virtualization layer.

10. The computer program product of claim 8 wherein identifying a level of high-availability for the associated physical storage includes:
    identifying a quantity of legs for the associated physical storage.

11. The computer program product of claim 8 wherein the virtual volume is an encapsulated virtual volume.

12. The computer program product of claim 8 wherein the point-in-time copy command is:
    a full point-in-time copy command.

13. The computer program product of claim 8 wherein the associated physical storage includes mirrored physical storage.

14. The computer program product of claim 8 wherein the associated physical storage includes stripped physical storage.

15. A computing system including a processor and memory configured to perform operations comprising:
    receiving a point-in-time copy command for a virtual volume exposed within a storage virtualization layer of a storage system;
    providing the point-in-time copy command to one or more data arrays underlying the storage virtualization layer;
    associating the virtual volume with physical storage within the one or more data arrays, thus defining associated physical storage;
    identifying a level of high-availability for the associated physical storage, wherein the level of high-availability is indicative of a redundancy technique used for the associated physical storage; and
    defining a high-availability copy by generating a copy of the associated physical storage that has the same level of high-availability, wherein the high-availability copy includes a differential point in time copy of the virtual volume including data that has changed since a previous copy command.

16. The computing system of claim 15 further configured to perform operations comprising:
   exposing the high-availability copy within the storage virtualization layer.

17. The computing system of claim 15 wherein identifying a level of high-availability for the associated physical storage includes:
   identifying a quantity of legs for the associated physical storage.

18. The computing system of claim 15 wherein the virtual volume is an encapsulated virtual volume.

19. The computing system of claim 15 wherein the point-in-time copy command is:
   a full point-in-time copy command.

20. The computing system of claim 15 wherein the associated physical storage includes mirrored physical storage.

\* \* \* \* \*